United States Patent [19]

Balsano

[11] Patent Number: 5,891,499
[45] Date of Patent: Apr. 6, 1999

[54] COMPOSITION FOR ELIMINATING UNSANITARY RESIDUES FROM FOOD PRODUCTS AND METHOD FOR USING THE SAME

[76] Inventor: Antonio Renato Balsano, Via Tremana, 13/D, Bergamo, Italy, I-20143

[21] Appl. No.: 129,925

[22] Filed: Aug. 6, 1998

Related U.S. Application Data

[63] Continuation-in-part of Ser. No. 765,774, Jan. 14, 1997, abandoned.

[30] Foreign Application Priority Data

Jul. 14, 1994 [IT] Italy .............................. MI94A 1479 U

[51] Int. Cl.⁶ ......................................................... A23L 3/34
[52] U.S. Cl. .......................... 426/335; 426/532; 134/25.3
[58] Field of Search ................................... 426/335, 532, 426/539; 134/25.3

[56] References Cited

U.S. PATENT DOCUMENTS 3,958,020  5/1976  de Vries .................................. 426/532
3,962,475  6/1976  Forest ...................................... 426/335
4,299,852  11/1981 Uens ........................................ 426/335
4,395,364  7/1983  Murata .................................... 252/526
4,770,884  9/1988  Hill .......................................... 426/335
5,354,568  10/1994 Bender .................................... 426/335
5,436,017  7/1995  Ludwig ................................... 426/532
5,641,530  6/1997  Chen ....................................... 426/335

FOREIGN PATENT DOCUMENTS 2009222  12/1977  Italy .

*Primary Examiner*—Carolyn Paden
*Attorney, Agent, or Firm*—Bucknam and Archer

[57] ABSTRACT

Composition useful for decontaminating surfaces of food products of animal, vegetable origin and fruit, in particular for eliminating microbic loadings and unsanitary substances, without altering and making noxious the food texture is described. A method is moreover disclosed for using said composition, comprising the steps of subjecting the food product to a bath of an aqueous solution of the composition and subsequently rinsing by water in order to remove the polluting substances being present. The food product may alternatively be sprayed with a solution of the composition.

14 Claims, No Drawings

COMPOSITION FOR ELIMINATING UNSANITARY RESIDUES FROM FOOD PRODUCTS AND METHOD FOR USING THE SAME

This application is a Continuation-in-part of U.S. Ser. No. 08/765,774 filed Jan. 14, 1997 now abandoned.

FIELD OF THE INVENTION

The present invention relates to a composition useful for processing food products of animal and vegetable origin, in particular fresh bird and pork meats as well as eggs, and fruits and vegetables, for eliminating polluting substances present on their surfaces, while preserving all of their useful and health properties. A method for using this composition is moreover disclosed.

BACKGROUND OF THE PRIOR ART

It is known that fresh food products, both of animal and vegetable origin, are frequently brought to the place of consumption loaded by unsanitary surface substances so as to provide a great risk for the health of the consumer. The unsanitary substances may consist of polluting agents of organic or inorganic chemical and microbic nature, deriving from the environment and animal, such as food residues, soil, secretions, defecations and the like.

In particular, the bacterial contaminations, the amount of which on the surface of live animals (such as swine and chicken) is of the order of several tens millions germs/cm$^2$ of skin, is responsible for the process of degradation of the food products. The odor characterizing the altering processes of a lot of food products, such as meats, chicken, or poultry, eggs, fish, etc., is mainly due to products deriving from the bacterial metabolism of the microflora (Pseudomonas, Achromobacter, Corynebacteria, etc.) and not to products of the tissue autolysis.

British patent application 2,009,222 published Jun. 13, 1979 in the name of the same applicant as the present application shows one attempt to eliminate unsatisfactory substances. It describes a composition consisting of Tween as a surfactant, sodium bicarbonate as a wetting agent, propyleneglycol as a dispersant, sodium hexametaphosphate as a sequestering agent, urea as an anti-dehydrating agent, citric acid as a buffer agent, sodium silicate and sodium sulfate as the inorganic salts. Clearly the surfactant is different from the present invention because Tween are esters of sorbitol with a fatty acid.

Carboxymethylcellulose is a very useful component because it has recontamination preventing properties but is not present in the composition of this publication.

The composition according to the above British application does not comply with the requirements imposed at present by international sanitary laws with respect to the lack of toxicity of the products being used in contact with the food and the safety of the food products.

The presence of microorganisms and unsanitary substances of chemical nature on the skin and generally on the outer layers of the food products, in addition to limiting the commercial duration of the products, also contributes to a contamination of the underlying muscle tissue in the case of meat and of the comestible inner portions in the case of eggs, by preventing their negotiability since bacteriological requirements must be met.

In the case of vegetables, the surface contamination negatively affects the sanitary and microbiological qualities in all the transformation and preservation steps of the finished products.

The industry in this field has addressed the problem of eliminating these toxic residues and improving the hygienic sanitary degree related to the processing of several food products, by adopting a number of solutions, the main of which is the solution which consists of using disinfectant substances in order to neutralize the bacterial loadings, as disclosed in U.S. Pat. No. 4,140,649 patent.

However, the proposed methods and compositions are practically unsatisfactory. In fact, the unsanitary substances to be removed, particularly in food products of animal origin, correspond to several tens of millions of germs/cm$^2$ of surface; the problem therefore is that because of the hygienic-sanitary aspect and economical aspect, there is the impossibility of the above mentioned method of removing tens of millions of germs/cm$^2$ of surface, so that there is a lack of elimination and the food products are rapidly perishable and toxic. Thus, chlorinated water has been already used (containing 10D20 ppm's of active chlorine): however, these disinfection methods lead to the presence of residues of the final products; in the specific case of the slaughtering of swine, it occurs that an amount larger than 50% of chlorine is retained on the meat and particularly on the fat tissue, so as to combine with the lipid fractions thereby providing new products, the dangers of which have not been established.

Moreover, according to the laws, it is not permitted to use disinfectant, antiseptic and antibacterial substances the residues of which would be susceptible to remain for an indefinite time in food products provided for human consumption, with dangerous consequences for the public health. This problem specifically affects the processing or treatment of bird and pork meats, for which the critical steps in which the most contamination occurs are the scalding bath, the plucking and entrails removal steps.

According to conventional meats cleaning methods, the animal carcass is subjected to a first washing step, by immersing it for a precisely set time into a hot water bath (the temperature of the bath being of 52°–55° C.), which also provides the advantage of facilitating the possible subsequent plucking step, in the case of birds, or pile removing step, in the case of swine. The output of the scalding bath, however, that is the total microbic loading on the outer surface of the carcasses corresponds, in the conventional processing methods, to values which can not meet the sanitary rules or requirements, since these values will increase after the plucking, pile removing and entrails removing steps, so as to cause altering processes to occur on the processed meat, to the detriment of their quality and preservation.

A further problem resides in the fact that the organic and inorganic materials carried by the slaughtered animals accumulate in the scalding bath and can achieve a concentration in the case of poultry processing, of 8.56% by weight of the bath itself: in this case, the pollution of meat will depend, in addition to a primitive pollution of the carcasses, on the greatly polluted working environment; in fact, the washing water, will tend to become, in time, a culture broth, mainly if, as it is conventional, one tries to extend the duration to the limit of the eight working hours, as in conventional operations.

The high temperature of the scalding basin is not sufficient to suppress the bacterial flora built-in therein and the most advanced slaughtering technique is not at present suitable to overcome this drawback.

In order to improve the processing sanitary conditions, both of scalding water and of the surface of the food products, the prior art teaches the addition of disinfectant substances to the washing water, which is however prohibited in all countries, in order to reduce the bacterial mass. However, it has been found that the hygienic properties of the slaughtered animal obtained by adding to the bath disinfectant substances, not only continue to be technologically insufficient, but, moreover, the food items are worsened by toxic residues retained on meat up to 60% of the concentration. Under the best hygienic-sanitary conditions and by the most improved technological systems adopted in modern industry, at the end of the processing on meat a bacterial load of the order of $5 \cdot 10^5$ germs/cm$^2$ of skin is found if simple washing water is used, whereas a bacterial load of about $1–3 \cdot 10^5$ germs/cm$^2$ of skin is found if to the washing water is added a disinfectant substance, and this is contrary to the CEE's rules. Thus, the bacterial load on the meat surfaces is too great to assure a proper hygienic-sanitary level. In view of the inefficiency or poor results of the above mentioned methods, the above mentioned unsanitary residues remaining on the meat surfaces are considered as technologically unavoidable by those skilled in the art.

Accordingly, there is a need of overcoming the above mentioned technical drawback, by providing a method for cleaning the surface of the above mentioned food products which does not use food additives susceptible to alter their organoleptic properties, aspect and texture, which does not use active disinfectant, anti-bacterial agents or other compositions prohibited by law, which is not toxic, does not alter the food products, and does not leave any residue on the food products itself.

The chemical and bacteriological contamination of the surface of agricultural origin food products is mainly due to the use of fertilizers, pesticide, weed-killer substances, systemic insecticides for plants and animals; these products have revolutionized the agricultural methods, but they leave on the food products residues which make these products incompatible with human health.

Accordingly, it is necessary to remove the above toxic residues also from the surfaces of vegetable origin food products both as they are provided for direct consumption and as they are provided for industrial transformation and processes of preservation.

SUMMARY OF THE INVENTION

Surprisingly a composition has been found capable of decontaminating food products of animal or vegetable origin, suitable to remove from their surfaces germ and unsanitary substance loads, without altering and making the food product texture toxic. This composition comprises sodium sulfate, a suspending agent, carboxymethylcellulose, propyleneglycol, at least a surface active agent, at least a bleaching agent, at least a sequestering agent, at least an anti-dehydrating agent, at least a buffering agent and at least an emulsifying agent.

Another object of the present invention is to provide a method for decontaminating the surface of food products of animal and vegetable origin, comprising the steps of subjecting the food product to a washing with an aqueous solution containing 0.05–1.5% of said composition, at a temperature of 15° C. to 65° C., for a time from 60 seconds to 6 minutes, depending on the animal and vegetable and the species to be processed, and performing successively a rinsing step by water.

Since pork and poultry meat has to be specifically processed, this method comprises the steps of subjecting the slaughtered animal to a bath in an aqueous solution containing from 0.1% to 0.3% of said composition during the washing step in the scalding bath and/or subjecting it to a shower spraying with an aqueous solution containing from 0.05% to 0.2% of the aforesaid composition during the subsequent steps of plucking, pile removal and entrails removal, and a subsequent rinsing step in either pure or sea water for removing the hydrosolubilized polluting substances.

Since fruit and vegetable products are to be decontaminated, the method comprises the use of the above mentioned composition in manual and mechanical washing operations of fruit and vegetables provided for their transformation and preservation.

DETAILED DESCRIPTION OF THE INVENTION

The characteristics and advantages of the composition for eliminating unsanitary residues from surfaces of food products and of the method using said composition according to the present invention will become more apparent from the following detailed disclosure.

The tissue layers which usually coat the animal and food products of vegetable origin constitute an ideal environment for the built-in of bacterial loads and toxic residues, since they provide an outer barrier impermeable to washing materials. Hot water per se, even at high temperatures, as used in the prior art, is not sufficient to fully solubilize this impermeable sublayer, so that a portion of the bacterial load and unsanitary substances remains. The composition according to the present invention has been designed for removing these unsanitary layers, and this is obtained by processing the food product so as to solubilize their outer surface to render the outer layer permeable to water and removal by subsequent rinsing operations with pure water of the sublayer on which the most part of the germs is present is carried out.

The removal of this surface layer of undesired substances and accordingly of the germs and toxic substances contained herein, is not performed by using antiseptic agents prohibited by law, but exploiting the ability of some chemical substances of removing the above mentioned layer, and which, in the meanwhile, are inert with respect to the animal tissues, and perfectly harmless since, upon washing, no residues remains on the surfaces of the food products.

The composition according to the present invention comprises:

sodium sulfate in an amount from 10 to 25% by weight based on the total composition, preferably in an amount of 14%;

carboxymethylcellulose as a recontamination preventing agent in an amount from 0.4 to 6% by weight, preferably 1%;

propyleneglycol as a dispersant in an amount from 0.5 to 5%, preferably 1%;

at least a surface active agent adapted to make hydrophilic the surface layer having no connection with the food product, selected from the alkylbenzene sodium sulfonates or alkyl-benzene triethanolamine sulfonates, the triethanolamine having preferably either a straight or branched alkyl chain comprising from 4 to 8 carbon atoms; said surface active agent being included in an amount from 1 to 7% by weight with respect to the total composition, preferably of 2%;

at least a bleaching agent, selected from sodium carbonate, sodium bicarbonate and potassium bicarbonate, preferably sodium bicarbonate. This bleaching agent is present in amount from 5 to 14% by weight of the composition, preferably 3% by weight; at least a sequestering agent for reducing the water hardness, and selected from sodium hexametaphosphate, sodium tripolyphosphate, trisodium edetate, preferably sodium hexametaphosphate; said sequestering agent being present in an amount from 4 to 8% by weight, preferably 6%; at least an anti-dehydrating agent for softening the outer tissue of the food product, this agent being selected from urea and sodium chloride, preferably urea; said anti-dehydrating agent being present in an amount from 1 to 7.5% by weight, preferably 2%;

at least a buffering agent, selected from sorbic acid, citric acid and malic acid, preferably malic acid, the buffering agent being present in an amount from 0.5 to 2% by weight, and preferably 1%;

at least an emulsifying agent, selected from sodium metasilicate and sodium orthophosphate, preferably sodium metasilicate; the emulsifying agent being present in an amount from 30 to 70% by weight, preferably 65%.

All the substances used in the composition are used in a pure form, without any toxic impurities. This composition constitutes a "technological aiding agent", i.e. a substance deliberately used for transforming food products in order to achieve a given techological objective during the processing or transforming step, as stated by Article 7, item 1, letter c) of the law decree of Jan. 27, 1992, Number 109, based on the 89/395-396/CEE guidelines. This composition does not contain antibacterial active agents or disinfectant agents or other components the use of which is prohibited by law; it, moreover, provides a good assurance of sanitary qualities and safety of the food products and in particular of the bird slaughtered meats, fully according to the requirements stated by the 92/116/CEE guideline-enc. B, chapter II, item c) and of the pork meat fully according to the requirements stated by the 83/90/CEE guideline-encl.1, chapter VI, comma 31. The composition of the present invention is not a disinfectant or an additive agent. The composition is in full compliance with the requirements of the international sanitary laws with respect to the lack of toxicity of the components and safety when applied on the food products.

The composition according to the present invention, constituted by inorganic salts, organic salts and surface active agents, with complete absence of disinfectant and antibacterial active agents; has the following features.

Physical properties

| physical status at 20° C. | powder |
|---|---|
| color | white |
| odor | odorless |
| pH at 20° C. | 10.3 |
| (aqueous solution at 0.15% by weight) | |
| water solubility | full |

Toxicologic properties

| acute oral toxicity | it is not considered toxic |
|---|---|
| local effect on the skin | irritating |
| local effect on eyes | irritating |
| first aid measures | wash by water |
| toxic impurities | none |
| danger | none |

The composition is not inflammable and not explosive.

The present invention also relates to a method of using the above mentioned composition for purifying the surface of food product of animal and vegetable origin, comprising the steps of subjecting the food product to a washing by an aqueous solution containing 0.05–1.5% of the above mentioned composition, at a temperature from 15° C. to 65° C., for a time from 60 seconds to 6 minutes, and then rinsing by water. Preferably, the temperature is from 20° C. to 55° C. in the case of birds, from 20° to 62° C. in the case of swine and from 20° to 35° C. for processing eggs, and from 15° to 40° C. in the case of vegetable products.

In particular, when swine and bird meats are processed, the method can be performed at the most critical points of the processing, in which the greatest contaminations occur, such as the scalding bath processing, the plucking step, the pile removal step and the entrails removing step, as well as on the finished product. In these cases, the method comprises the steps of subjecting the food product to a bath of an aqueous solution containing from 0.1% to 0.3% of the composition of this invention during the washing step in the scalding bath, holding the temperature at 50°–52° C. for chicken, 20°–62° C. for swine, and/or subjecting the slaughtered bodies to a shower spraying with an aqueous solution containing from 0.05% to 0.2% of the aforesaid composition during the subsequent steps of plucking, pile removing and entrals removing, and on the finished product. A subsequent rinsing step with pure water or sea water will allow to definitely remove the hydrosolubilized polluting substances and any undesirable surface residues.

The composition according to the present invention and the method using it are effective in the case of sanitary improvement of meat in general and fish, in addition to egg shells, vegetable products and fruit with good organoleptic and microbiological results of decontamination of microbial load of Salmonella and *E.Coli*.

The sanitary advantages of the processing method using the above mentioned composition are also extended to all the by-products of bird and swine processings, which are deodorized such as carcases, chitterlings, bones, feathers, pile and several residues provided for reuse, in the form of commercial meals, in the zootechnical feeding.

The sanitizing action of the above mentioned composition, as it is used in a washing bath of water, can be further improved or enhanced by flowing into said water an ozonized air stream, provided by a suitable ozonizer. The oxygen, as it is quickly dissolved in the washing water, will provide a further sanitizing effect on the surface of the food products, thereby improving the surface sanitary quality, will provide a greater alimentary safety and a longer duration of preservation of the food products.

Experimentally it has been found that, by blowing in ozone into the water containing the composition of the invention, on the surfaces of the food products no oxidation reactions capable to modify or alter the natural characteristics of the alimentary surfaces occur, and, moreover, no dangerous residue can be found on said surfaces capable of being harmful to human health.

By operating under these conditions, moreover, it is possible to sanitize food products which are notoriously known as poorly responsive to common processing methods, such those obtained, in particular, from animals bred under anomalous conditions, specially from a hygienic-sanitary standpoint.

The composition of this invention and method of use will allow to provide great sanitary improvements and, in particular, on meat:

reduction of the total microbial load (CMT) on the skin, equal to three logarithmic units, which corresponds to a removal of at least 99.99% of the total microbial load and at least 99.94% of Salmonella and *E.Coli*;

a greater duration of preservation of the slaughtered animal of 50–100% greater than the conventional duration; this period is greater by an amount up to 15 days than the regular duration in the case of bird meat.

The aforesaid composition modifies the chemical-physical properties of the scalding or spraying water with great efficiency of the chemical and microbial decontamination of the food product surfaces, but it does not negatively affect the food products, and the organoleptic, and preservability characteristics thereof will be drastically improved.

The final meat products obtained by the method of this invention have characteristics of very great alimentary safety, since the components of the inventive composition are not toxic, not dangerous and fully soluble in water;

- the composition does not modify the texture of the cellular tissues of the carcasses;
- the composition does not affect the usual biochemical post-mortem variations of glycogen, lactic acid and ammonia nitrogen which conventionally occur in meats;
- the composition does not leave on the surface of the processed animals, after the conventional rinsing operations, any undesirable residues extraneous to the meat;
- the end products are characterized by the absence of any slimy residue since the skin color and hue are unchanged without any disagreeable odors and taste.

In the case of pork meats, the above characteristics allow to obtain both a more even salting and ageing of the cured hams and a more even seasoning of the sausages.

The operating advantages, of great economical incidence which are particularly achieved in the overally slaughtering process, by adopting the method according to the present invention, both in the presence and in the absence of ozonization, are hereinbelow schematically illustrated;

- improvement of the production yield;
- reduction of the scalding bath temperature, held at 20°–55° C. for birds, at at 20°–62° C. for swine, thereby obtaining less cooked meat without abrasions;
- the possibility of using the same bath, without any disagreeable odors, for the full duration of a continuous working cycle of 8 hours;
- reduction of the amount of water required in the slaughtering process for any kg of meat;
- improvement of the pile removing and plucking steps, with less abrasions on the skin in the particular case of pork meat or bird meat;
- quick drying of the animal carcasses, even without using air streams;
- sanitation and deodorization of the slaughtering by-products (feathers, pile, waste and so on);
- sanitization and deodorization of the processing equipment, and in general of the working environment;
- lacking of clogging of the draining channels,
- improvement of the biodegradability of the waste water.

A further advantage of the present invention relates actually, to the ecological impact of the above mentioned composition, which shows a biodegradability greater than 99% since its presence in waste waters does not negatively affect any purification process.

Moreover, the concentration of phosphorus which is present in a liter of an aqueous solution of the above mentioned composition at 0.15%, corresponds to 6.20 pg, which is about 1000 times lower than the allowed maximum amount.

In order to better illustrate the present invention, without limiting it, there are hereinbelow disclosed the following examples:

EXAMPLE 1

Use of the inventive composition in a poultry immersion bath

A practical demonstration of the sanitary efficacy of the composition according to the present invention and method using it, can be deduced by a comparison of the microbiological values which have been found in experiments carried out on poultry or chicken processed exclusively by water and on poultry processed by an aqueous solution of the composition of the present invention at 0.15% in the scalding bath water.

The composition used comprises:

| | |
|---|---|
| triethanolamine alkylbenzene sulfonate | 1.15% |
| sodium carbonate | 7.10% |
| sodium hexametaphosphate | 6.20% |
| urea | 1.87% |
| malic acid | 1.79% |
| sodium metasilicate | 67.47% |
| sodium sulfate | 13.15% |
| carboxymethylcellulose | 0.41% |
| propyleneglycol | 0.86% |

The adopted slaughtering conditions correspond to the following:

| | |
|---|---|
| amount of processed carcasses | 20000 grams |
| water temperature | 51° C. |
| amount of water in the scalding basin | 6000 l |
| slaughtering chain speed | 9 kg |
| CMT on the chicken before processing | $6\text{-}10^6$ germs/cm$^2$ skin |

The drawings have been performed each hour for a time from 7 hours to 13 hours and from 14 hours to 16 hours, that is for 8 hours of continuous processing from start. The total microbial load (CMT) has been determined by conventional methods; the obtained results are hereinbelow shown in Table 1.

TABLE 1

Total microbial load (CMT) on the surface of the slaughtered carcasses.

| TIME (hours) | CMT (germs/cm$^2$) with the composition at 0.15% | CMT (germs/cm$^2$) with water only |
|---|---|---|
| 7 | $1.1 \cdot 10^3$ | $3.9 \cdot 10^6$ |
| 8 | $1.2 \cdot 10^3$ | — |
| 9 | $1.0 \cdot 10^3$ | — |
| 10 | $1.4 \cdot 10^3$ | $4.8 \cdot 10^6$ |
| 11 | $1.6 \cdot 10^3$ | $5.7 \cdot 10^6$ |
| 12 | $2.1 \cdot 10^3$ | $5.6 \cdot 10^6$ |
| 13 | $1. \cdot 10^3$ | $6.1 \cdot 10^6$ |
| 16 | $2.4 \cdot 10^3$ | $7.2 \cdot 10^6$ |

The obtained experimental data show a high efficiency, which previously was considered as impossible to obtain from the removal of the skin of the animals of saprophyte and pathogenous germs in an amount of three logarithmic units.

In the case of use of the above mentioned composition in the scalding bath, there is moreover observed an improvement of the plucking step, a reduction of the skin abrasions, an absence of residual slime, consequent quick drying and, finally, a greater duration time of preservation at 2°–3° C. without any altering processes.

At the end of the treatment, the meat has the following organoleptic and inspectorial characteristics:

odor: natural, absence of any fecal odors color: natural pink taste: typical of chicken aspect: perfect texture: optimum morphological examination: no evident damage to organs and tissues extraneous chemical residues: absent

EXAMPLE 2

Comparative tests on poultry between the use of the composition of this invention and use of chlorine and iodine based disinfectant solutions These tests have been carried out on Hubbard bred chicken from an industrial breeding farm. In a first series of tests, chicken have been subjected to a spray washing, after entrails removal for 1, 2 and 4 minutes, respectively by a control solution with pure water containing the composition of the invention as disclosed in Example 1, at 0.2%, and an aqueous chlorine solution (200 ppm's) and an aqueous iodine solution (200 ppm's).

In a second series of tests, chicken have been immersed in a hot bath respectively of control pure water, a solution containing the aforesaid composition at 0.2%, an aqueous chlorine solution (200 ppm's) and an iodine aqueous solution (200 ppm's).

The performed analysis has provided an evaluation of the total bacterial load as well as of the Coliforms and Streptococci D.

The used culture media were triptosium agar for the total count, the McConvey's soil for *E. Coli* and coliforms, and the Escherichia azide agar soil for the Streptococci D.

The chicken taken at the times shown in Table 2 have been subjected to a skin removal operation at their anal region. The skin has been then homogenized in a mixer with ¼ of a peptone/salt solution. After decimal dilutions, the soils or culture media have been seeded and incubated at 30° C. and 37° C. for 3 days.

The results of the two tests are summarized in Tables 2 and 3.

TABLE 2

Effects of a spraying washing on poultry by solutions of the composition of this invention, chlorine and iodine on the total microbe load, on the levels of *E. Coli* and coliforms and on the levels of *streptococci D*.

| TIME (min.) | treatment by 0.20% solution | treatment by a chlorine solution (200 ppm's) | treatment by an iodine solution (200 ppm's) | pure water control |
|---|---|---|---|---|
| TOTAL BACTERIAL LOAD (germs/cm$^2$) | | | | |
| 1 | $10^5$ | $10^6$ | $10^6$ | $10^6$ |
| 2 | $10^4$ | $10^5$ | $10^6$ | — |
| 4 | $10^3$ | $10^4$ | $10^6$ | $10^6$ |
| *E. COLI* AND COLIFORMS (germs/cm$^2$) | | | | |
| 1 | $10^3$ | $10^4$ | 104 | $10^5$ |
| 2 | $10^3$ | $10^4$ | $10^4$ | — |
| 4 | $10^2$ | $10^2$ | $10^3$ | $10^5$ |
| *STREPTOCOCCI D* (germs/cm$^2$) | | | | |
| 1 | $10^4$ | $10^5$ | $10^4$ | $10^5$ |
| 2 | $10^3$ | $10^5$ | $10^4$ | — |
| 4 | $10^2$ | $10^3$ | $10^4$ | $10^5$ |

TABLE 3

Effects of washing by immersing chicken into solution of the composition of this invention, chlorine and iodine on the total microbe or bacterial load, on the levels of *E. Coli* and coliforms and on the levels of *streptococci D*.

| TIME (min.) | treatment by 0.20% solution | treatment by a chlorine solution (200 ppm's) | treatment by an iodine solution (200 ppm's) | pure water control |
|---|---|---|---|---|
| TOTAL BACTERIAL LOAD (germs/cm$^2$) | | | | |
| 2 | $10^4$ | $10^4$ | $10^5$ | $10^6$ |
| 4 | $10^4$ | $10^4$ | $10^5$ | 106 |
| *E. COLI* AND COLIFORMS (germs/cm$^2$) | | | | |
| 2 | $10^2$ | $10^2$ | $10^4$ | $10^4$ |
| 4 | $10^2$ | $10^2$ | $10^4$ | $10^4$ |
| *STREPTOCOCCI D* (germs/cm$^2$) | | | | |
| 2 | $10^2$ | $10^2$ | $10^4$ | $10^4$ |
| 4 | $10^2$ | $10^2$ | $10^4$ | $10^4$ |

The above data show a reduction of the total bacterial or microbe load corresponding to three logarithmic units, as well as a nearly complete elimination of *E. Coli* and Streptococci D.

The organoleptic characteristics of the products which have been treated with the composition according to the present invention are irreproachable, while they are abnormal and with an intensive chlorine and iodine odor in the other two cases.

Finally, the treatment by the composition according to the invention provides very good sanitary characteristics which are very safe from a toxicity standpoint, whereas the chlorine and iodine solutions leave present toxic residues in an amount from 50 to 100% of the used concentration, so that they are not suitable for food consumption.

The duration of the preservation time of the chicken is increased by 13 days using the composition of the invention, with respect to 8 and 6 days respectively obtained by a treatment using the chlorine and iodine containing solution.

EXAMPLE 3

Comparative tests on swine, between the use of the composition of the invention and of chlorine and iodine based disinfectant solutions The two test series performed on chicken, according to the Example 2, have been repeated on swine; the results are shown in Tables 4 and 5.

TABLE 4

Effects of a spray washing on swine, using solutions of the composition of the invention, chlorine and iodine on the total bacterial load, and on the levels of *E. Coli* and coliforms and *streptococci D*.

| TIME (min.) | treatment by 0.20% solution | treatment by a chlorine solution (200 ppm's) | treatment by an iodine solution (200 ppm's) | pure water control |
|---|---|---|---|---|
| TOTAL BACTERIAL LOAD (germs/cm$^2$) | | | | |
| 1 | $10^6$ | $10^6$ | $10^5$ | 106 |
| 2 | $10^5$ | $10^5$ | $10^5$ | — |
| 4 | $10^4$ | $10^5$ | $10^5$ | — |
| *E. COLI* AND COLIFORMS (germs/cm$^2$) | | | | |
| 1 | $10^3$ | $10^3$ | $10^3$ | $10^4$ |

TABLE 4-continued

Effects of a spray washing on swine, using solutions of the composition of the invention, chlorine and iodine on the total bacterial load, and on the levels of *E. Coli* and coliforms and *streptococci D*.

| TIME (min.) | treatment by 0.20% solution | treatment by a chlorine solution (200 ppm's) | treatment by an iodine solution (200 ppm's) | pure water control |
|---|---|---|---|---|
| 2 | $10^2$ | $10^2$ | $10^3$ | — |
| 4 | 10 | 10 | $10^3$ | 104 |
| *STREPTOCOCCI D* (germs/cm$^2$) | | | | |
| 1 | $10^3$ | $10^3$ | $10^3$ | $10^4$ |
| 2 | $10^2$ | $10^2$ | $10^3$ | — |
| 4 | 10 | $10^2$ | $10^3$ | $10^4$ |

TABLE 5

Effects of washing by immersing swine into solutions of the composition of the invention, chlorine and iodine on the total bacterial load, on the levels of *E. Coli* and coliforms and on levels of *streptococci D*.

| TIME (min.) | treatment by a 0.20% solution | treatment by a chlorine solution (200 ppm's) | treatment by an iodine solution (200 ppm's) | pure water control |
|---|---|---|---|---|
| TOTAL BACTERIAL LOAD (germs/cm$^2$) | | | | |
| 1 | $10^5$ | $10^6$ | $10^6$ | $10^6$ |
| 2 | $10^4$ | $10^5$ | $10^6$ | — |
| 4 | $10^3$ | $10^4$ | $10^6$ | $10^6$ |
| *E. COLI* AND COLIFORMS (germs/cm$^2$) | | | | |
| 1 | $10^5$ | $10^5$ | $10^3$ | $10^6$ |
| 2 | $10^4$ | $10^4$ | $10^3$ | — |
| 4 | $10^3$ | 10 | 102 | $10^6$ |
| *STREPTOCOCCI D* (germs/cm$^2$) | | | | |
| 1 | $10^3$ | $10^3$ | $10^3$ | $10^4$ |
| 2 | $10^2$ | $10^2$ | $10^3$ | — |
| 4 | 10 | $10^2$ | $10^2$ | $10^4$ |

Also in this case, the composition according to the present invention provides a significant reduction, with respect to the controls, of the surface bacterial load present on the skin of the slaughtered swine. The composition administered by spraying an aqueous solution, or as a direct bath, has demonstrated an efficiency which can be compared with that of the chlorine solution having a concentration of 200 ppm's, however without toxicity and incompatibility in the treatment of food products.

EXAMPLE 4

Effects of the composition of the invention on the microbic flora contaminating the hen egg shells.

The tests have been carried out on four samples of 24 eggs each (12 of which being control samples), the shells of which have been soiled under different conditions:

SAMPLE 1

Poultry excrements have been diluted with a physiological solution and homogenized in a mortar so as to provide a homogeneous suspension. The thus obtained material has been used for soiling, by a cotton pad, the shells of conventionally commercially available eggs. After soiling, the eggs have been left at room temperature for 24 hours, in order to allow the material to dry on the surface of the shells.

SAMPLE 2

The egg shell has been soiled, instead of using diluted poultry excrements, with blended cultures of microorganisms obtained from eggs taken from an egg-hen breeding farm; the following operations have been carried out as described in Sample 1.

SAMPLE 3

The egg shell has been soiled by using pure cultures, mutually blended, of *E. Coli* and *S. typhimurium*. Even in this case, the following operations have been carried out as hereinabove described.

SAMPLE 4

Commercially available eggs have been used, the shells of which were not soiled in any manners.

For washing the shells, aqueous solutions containing the composition of the invention as used in Example 1 and having the following concentrations have been used: for Samples 1 and 2: 0.2, 0.4, 0.6, 0.8, 1.0 and 1.2% for Samples 3 and 4

SHELL WASHING METHOD

Upon processing as described hereinabove, all the eggs were immersed for two minutes into one of the above described solutions, or in a physiologic solution (a control set) held at room temperature; then they were accurately washed by using bristle brushes. Upon holding the eggs at room temperature for an hour so as to allow their shells to dry, they were washed again by a peptonized physiological solution (20 ml for egg) by using again sterilized brushes. The thus obtained washing liquid was diluted according to 10-base logarithmic units up to $10^{-6}$, and the several dilutions were being used for seeding the different culture media.

BACTERIOLOGICAL TESTS

All of the bacteriological analyses were performed by using DIFCO R soils or media and, more specifically:

for determining the total bacterial load a Bacto plate count agar was used;

for the colimetry and counting *E. Coli* Bacto violet red bile agar was used;

for counting Salmonellae a Bacto brilliant green agar was used. The used procedures are conventionally known.

The results of the bacteriological tests have been collected in the following Table 6.

TABLE 6

Bacteriological tests on eggs of Sample 1–4

| WASHING SOLUTION CONCEN- TRATION | UFC*/EGG TOTAL BACTERIAL LOAD | UFC/EGG COLI- MEASURE- MENT | *E. COLI*/ EGG | *S. TYPHIMU- RIUM*/EGG |
|---|---|---|---|---|
| SAMPLE 1 | | | | |
| Control Set | $8.0 \cdot 10^5$ | $3.0 \cdot 10^4$ | — | — |
| 0.2% | $4.8 \cdot 20^5$ | $2.5 \cdot 10^4$ | — | ¤¤ |
| 0.4% | $2.0 \cdot 10^5$ | $9.0 \cdot 10^3$ | — | ¤¤ |
| 0.6% | $3.2 \cdot 10^4$ | $3.0 \cdot 10^3$ | — | ¤¤ |
| 0.8% | $8.8 \cdot 10^3$ | $4.4 \cdot 10^2$ | — | ¤¤ |
| 1.0% | $7.7 \cdot 10^2$ | $9.0 \cdot 10^1$ | — | ¤¤ |
| 1.2% | $6.0 \cdot 10^2$ | $7.3 \cdot 10^1$ | — | ¤¤ |
| SAMPLE 2 | | | | |
| Control Set | $1.7 \cdot 10^7$ | — | ¤¤ | — |
| 0.2% | $9.0 \cdot 10^6$ | — | ¤¤ | — |
| 0.4% | $3.2 \cdot 10^6$ | — | ¤¤ | — |
| 0.6% | $6.4 \cdot 10^5$ | — | ¤¤ | — |
| 0.8% | $2.8 \cdot 10^5$ | — | ¤¤ | — |
| 1.0% | $7.6 \cdot 10^4$ | — | ¤¤ | — |
| 1.2% | $6.4 \cdot 10^4$ | — | ¤¤ | — |
| SEMPLE 3 | | | | |
| Control Set | — | ¤¤ | $6.1 \cdot 10^5$ | $3.9 \cdot 10^4$ |

TABLE 6-continued

Bacteriological tests on eggs of Sample 1–4

| WASHING SOLUTION CONCEN-TRATION | UFC*/EGG TOTAL BACTERIAL LOAD | UFC/EGG COLI-MEASURE-MENT | E. COLI/ EGG | S. TYPHIMU-RIUM/EGG |
|---|---|---|---|---|
| 1.0% SAMPLE 4 | — | ¤¤ | $8.4 \cdot 10^2$ | $1.2 \cdot 10^1$ |
| Control Set 1.0% | $7.6 \cdot 10^3$ $3.2 \cdot 10^0$ | — — | ¤¤ ¤¤ | — — |

*By UFC there are meant colony forming units.

Each value of the above Table represents the numerical average of 10 analyses each performed on 12 eggs.

The several solutions of the product being tested facilitate the egg washing operations, with results which are directly proportional to the concentration of the used composition; this advantage could be enhanced by performing the washing operation at a temperature of 37°–40° C., as conventionally used for washing eggs (the latter mentioned tests were carried out at room temperature).

The results show that the composition of the invention is suitable to greatly improve the aesthetic aspect of the shell, since it makes the shell brighter and whiter; this effect is maximum as the concentration of the used solution is 0.6%.

The microbiological effects are directly proportional to the concentration of the solution used for washing the shells; the effect is nearly zero or negligible up to a value of 0.6% of the solution concentration, but it is particularly evident at a concentration of 1%, for which the reduction of the number values of the microorganisms is of three logarithmic units. The composition has been found to be particularly effective for decontaminating shells from Salmonella. In this connection it should be pointed out that usually the soilings of the shells are much smaller than those artificially made in order to stress the advantages of the composition according to the present invention.

EXAMPLE 5

Persistence of the inventive composition on the skin of poultry

The persistence of the components of the composition of the invention as described in Example 1, on the skin of poultry processed by a solution at 0.15% of the same has been evaluated after the poultry stunning and bleeding steps, and before the plucking step.

50 animals having an average weight of 1.800 kg have been used: a first set of 25 animals have been subjected to conventional slaughtering and carcass preparing procedures (immersion into water warmed to 55° C., feather removal, washing and entrails removal steps) by adding to the water bath into which the animals were immersed, before removing the feathers, an amount of the composition of the invention suitable to provide a concentration of 0.15%.

A second set of 25 animals were subjected to the same experimental procedure by adding to the warm water bath an amount of the same composition suitable to provide a concentration of 0.075%.

The animals were divided into 5 sets (each of 5 animals) of which 1 set (a control set) was immersed into warm water not containing the composition of the invention, whereas the other 4 sets were immersed into the above described solutions.

For all the sets, the immersion period was 20 seconds.

Of the 4 sets processed by the solution being tested at the two mentioned different concentrations, a set (SET A) after the feather removal step was not subjected to any further washing process; a second set (SET B) was successively washed with 350 ml of water percolated onto the animal; a third set (SET C) was washed with 700 ml of water for animal; finally, a fourth set (SET D) was washed with 1050 ml of water for animal.

At the end of the preparation 25 g of skin were taken from all the animals. They were finely homogenized by Ultraturax R, by adding to each sample 125 ml of bidistilled water. The homogenized material was subjected to a double filtering operation on absorbent paper and the filtered liquid was used for analysis.

By using known methods, the biological meaning residues, in particular sodium metasilicate and sodium alkylarylsulfonate were determined.

Persistence of $SiO_2$ residues on the poultry skin

The results of this test are shown in Table 7.

TABLE 7

$SiO_2$ residues on the poultry skin

| Set | No. of animals | $SiO_2$ found(*) ppm/skin | $SiO_2$ calculated(**) ppm/animal |
|---|---|---|---|
| CONCENTRATION OF 0, 15% | | | |
| Controls | 5 | 0 | 0 |
| A animals not washed | 5 | 46.7 | 1.86 |
| B animals washed by 350 ml/animal | 5 | 34.3 | 1.37 |
| C animals washed by 700 ml/animal | 5 | 36.5 | 1.46 |
| D animals washed by 1050 ml/animal | 5 | 35.2 | 1.40 |
| CONCENTRATION OF 0, 15% | | | |
| Controls | 5 | 0 | 0 |
| A animals not washed | 5 | 23.7 | 0.92 |
| B animals washed by 350 ml/animal | 5 | 16.3 | 0.65 |
| C animals washed by 700 ml/animal | 5 | 17.2 | 0.69 |
| D animals washed by 1050 ml/animal | 5 | 15.9 | 0.63 |

(*)µg $SiO_2$/g skin
(**)Since the skin constitutes about 4% of the animal body weight, the concentration of $SiO_2$ has been referred to the total carcass (µg/g animal)

The silicon dioxide, in the amounts included in the animal carcass as shown by these analyses does not cause any toxic effect. Persistence of sodium alkylarylsulfonate residues on the poultry skins The results of this test are show in the following Table 8.

TABLE 8

Residues of sodium alkylarylsulfonate (ABS) on the poultry skins

| Set | No. of animals | triethanolamine alkyl benzensulfonate found(*) ppm/skin | triethanolamine alkyl benzensulfonate calculated(**) ppm/animal |
|---|---|---|---|
| CONCENTRATION OF 0, 15% | | | |
| Controls | 5 | 0 | 0 |
| A animals not washed | 5 | 1.9 | 0.076 |
| B animals washed by 350 ml/animal | 5 | 1.0 | 0.040 |
| C animals washed by 700 ml/animal | 5 | 0.4 | 0.016 |

TABLE 8-continued

Residues of sodium alkylarylsulfonate (ABS) on the poultry skins

| Set | | No. of animals | triethanolamine alkyl benzensulfonate found(*) ppm/skin | triethanolamine alkyl benzensulfonate calculated(**) ppm/animal |
|---|---|---|---|---|
| D | animals washed by 1050 ml/animal | 5 | 0 | 0 |
| CONCENTRATION OF 0, 15% | | | | |
| Controls | | | | |
| A | animals not washed | 5 | 0.9 | 0.036 |
| B | animals washed by 350 ml/animal | 5 | 0.5 | 0.020 |
| C | animals washed by 700 ml/animal | 5 | 0.20 | 0.008 |
| D | animals washed by 1050 ml/animal | 5 | 0 | 0 |

(*)$\mu$g $SiO_2$/g skin
(**)Since the skin constitutes about 4% of the animal body weight, the sodium alkylbenzene sulfonate concentration has been referred to the total carcass ($\mu$g/g animal)

As shown by the above results, no alkylarylsulfonate residue is found on the poultry skin after washing the animals (sensibility of the analysis method: 0.1 ppm). Even by allowing residues of ABS on the poultry skin less than 0.1 ppm, the toxic effects of this substance, at such a dose, are practically zero. In this connection, the CEE Rule of the Counsel of Sep. 18, 1979, bearing the 6th modification of the CEE Rule 67D548 of the GEE Official Gazette L259 of Oct. 15, 1979, considers ABS to be non-toxic since the $DL_{50}$, as determined orally and cutaneously in rat and rabbit is greater than 2000 mg/kg.

In view of the good results obtained on the surface of products of animal origin, the composition according to the present invention has also been tested on vegetable food products and fruit.

Since it is practically impossible to test the effect of the composition on all the noxious substances used in agriculture, the tests have been limited to the removal of residues pertaining to the fertilizer class both of chemical and biological nature.

For the test were used 6 sets (including 3 control sets) of the following vegetable products, representative of vegetables: carrots, tomatoes, peppers, fennels and of the following fruit: apples, pears, peaches, apricots.

For simulating the fertilization processing of the products, No. 2 samples were then prepared:

SAMPLE NO. 1

To a physiological solution were added 5 g/each of the following phosphate fertilizers (sodium perphosphate), nitric fertilizers (ammonium sulfate) and potassium fertilizers (potassium carbonate) so as to provide a homogeneous solution. Into this vath was immersed for few seconds the first set including vegetable and fruit; then the sample was allowed to dry for 24 hours in order to allow the material to dry on the surface.

SAMPLE NO. 2

Into a second physiological solution poultry excrements have been homogenized so as to provide a homogeneous slurry. This slurry was divided into two portions, into one was immersed for few seconds the 2nd set including vegetables; into the 2nd slurry portion was immersed, for few seconds, the 3rd set comprising fruit. Both these sets were left to dry for 24 hours at room temperature.

The same processing method for Samples 1 and 2 was applied to the three control sets.

After 24 hours after the artificial soiling operations on the food products, the samples of 1st, 2nd and 3rd sets were subjected to a bleaching operation for three minutes in a solution containing 1% of the composition of the invention at room temperature.

Then, all the three sets were abundantly rinsed and left to rest for one hour. Afterwards, all the three sets were washed with a physiological solution (50ml/50g vegetable) and the obtained liquids were respectively subjected to analysis; the 1st set to a chemical analysis in order to show the chemical fertilizer residues (phosphate, nitrate and potassium residues), which, being all soluble in the rinsing water provided a zero result, so that they confirmed a 100% decontamination. The washing liquids obtained from the 2nd and 3rd set contaminated by excrements, were subjected to an analysis by known bacteriological methods in order to find the total bacterial or microbial load. That same treatment, with the exclusion of the bleaching step by the solution with the composition of the invention, was performed on the control sets.

The results are shown in the following Tables 9 and 10.

TABLE 9

Residues of phosphorus, nitrogen and potassium fertilizer after a processing with the composition of the invention at 1%

| Set No. 1 | Number | Residues found ppm/g skin |
|---|---|---|
| control | 4 | 40 |
| vegetables | 4 | 0 |
| fruit | 4 | 0 |

TABLE 10

Bacteriological tests on the vegetables and fruit of sets 2 and 3

| Concentration of the washing solution: 1% | UFC/piece total microbial load |
|---|---|
| Control set No. 2 | $8.0 - 10^4$ |
| carrots | 5.1 - 10 |
| tomato | 2.4 - 10 |
| pepper | 3.0 - 10 |
| fennels | 4.2 - 10 |
| Control set No. 3 | $8.0 - 10^4$ |
| apples | 3.4 - 10 |
| pears | 2.4 - 10 |
| peaches | 4.1 - 10 |
| apricots | 3.6 - 10 |

It was possible to perform these tests since the vegetable and fruit samples were provided with a firm outer fibre surface; so that the results can be considered as meaningful and interesting for all the operations carried out on vegetables food products too, and fruit, both provided for direct consumption and provided for industrial transformation and preservation processes.

What is claimed is:

1. A composition useful for eliminating unsanitary chemical and microbiological residues from the surfaces of food products of animal, vegetable origin and fruit, consisting each by weight of 10% to 15% sodium sulfate; 0.4% to 6% carboxymethylcellulose; 1% propylene glycol by weight; 2% of a surface active agent consisting of an alkyl benzene triethanolamine sulfonate or an alkyl benzene sodium sulfonate having either a straight or a branched alkyl chain comprising from 4 to 8 carbon atoms; 8% sodium carbonate as a bleaching agent; 4% to 8% of a sequestering agent consisting of sodium hexametaphosphate, sodium tripolyphosphate or trisodium edetate; from 1% to 7.5% of an antidehydrating agent consisting of urea or sodium chloride; from 0.5% to 2% of a buffering agent consisting of sorbic acid, citric acid or malic acid; and from 30% to 70% of an emulsifying agent selected from the group consisting of sodium metasilicate and sodium orthophosphate.

2. The composition according to claim 1, wherein said sodium sulfate is present in an amount of 14% by weight.

3. The composition according to claim 1, wherein said sequestering agent is sodium hexametaphosphate, in an amount of 6% by weight.

4. The composition according to claim 1, wherein said antihydrating agent is urea, in an amount of 2% by weight.

5. The composition according to claim 1, wherein said buffering agent is malic acid, in an amount of 1% by weight.

6. The composition according to claim 1, wherein said emulsifying agent is sodium metasilicate, in an amount of 65% by weight.

7. A method of eliminating unsanitary chemical and microbiological residues from surfaces of food products of animal, vegetable origin and fruit, which consists of the step of washing said food products with an aqueous solution containing 0.05%–1.5% by weight of the composition according to claim 1 at a temperature of 15°–65° C. for a period of 60 seconds up to 6 minutes and then rinsing with water.

8. The method according to claim 7, wherein said food products comprise eggs, vegetables and fruit, said method being carried out at a temperature from 20° to 35° C.

9. The method according to claim 8, wherein the food products are vegetables and fruit and toxic materials used in agriculture are removed.

10. The method according to claim 7, wherein said food products are vegetables which comprises the step of subjecting said vegetables to washing with an aqueous solution containing from 0.10% to 3% of said composition, at a temperature from 15° C. to 40° C. for a set time depending on the vegetable species of said food product and on the manual or automatic washing type.

11. A method of eliminating unsatisfactory chemicals and microbiological residues from the surface of chicken and swine meat which require final steps of plucking, pile removal and entrail removal, which consists of step 1) of scalding said meat in a solution containing 0.1%–0.3% of said composition according to claim 1 or step 2) spraying said meat with an aqueous solution containing 0.05%–0.2% of said composition according to claim 1 or both applying said step 1) and said step 2) and then applying step 3) of rinsing with pure water or sea water.

12. The method according to claim 11, wherein during said scalding step an ionized air stream is blown into a scalding bath water.

13. The method according to claim 11, wherein the food product is chicken and the temperature is 20°–55° in the scalding bath.

14. The method according to claim 11, wherein the food product is swine meat and the temperature in the scalding bath is 20°–62° C.

* * * * *